Sept. 8, 1942.    W. A. LEBUS    2,295,486
VENT VALVE
Filed March 6, 1940    2 Sheets-Sheet 1

Witness:
V. Siljander

Inventor
William A. Lebus
By: Hill & Hill, Attys.

Sept. 8, 1942.   W. A. LEBUS   2,295,486
VENT VALVE
Filed March 6, 1940   2 Sheets-Sheet 2
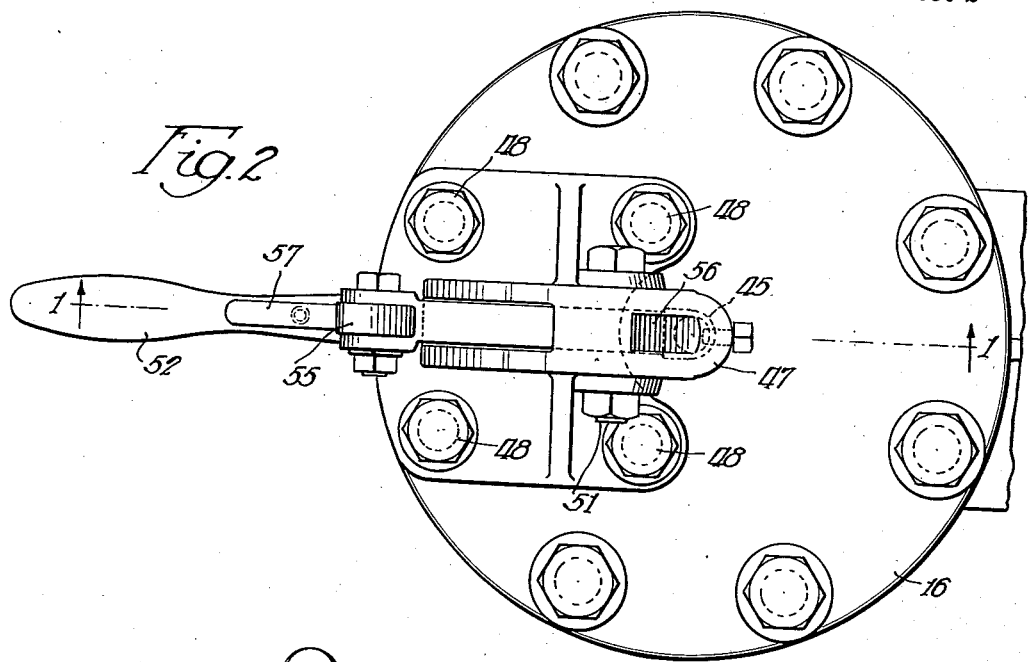
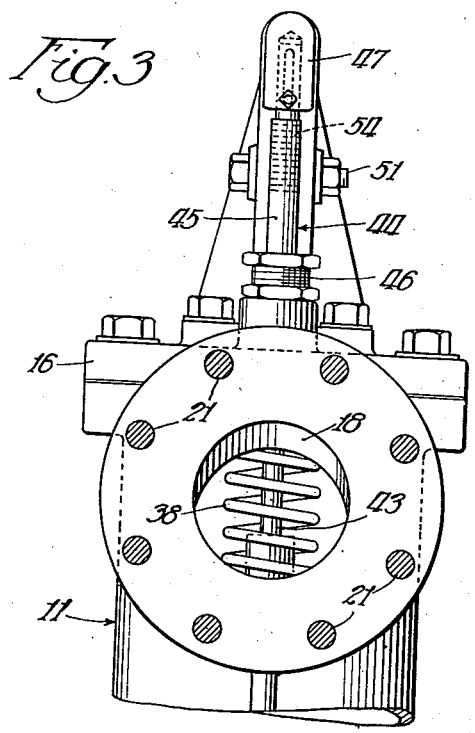
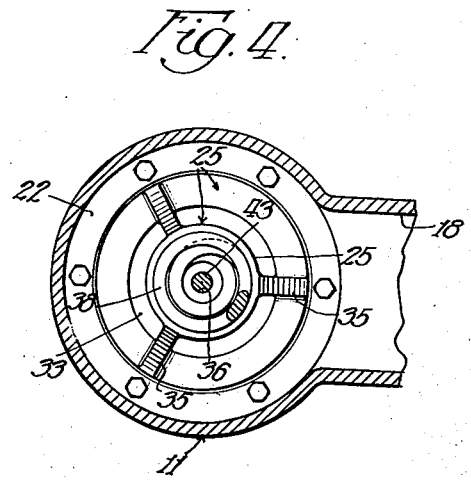
Witness.
V. Siljander
Inventor
William A. Lebus
By: Hill & Hill, Attys.

Patented Sept. 8, 1942

2,295,486

UNITED STATES PATENT OFFICE 2,295,486

VENT VALVE

William A. Lebus, Chicago, Ill., assignor to Protectoseal Company of America, Inc., Chicago, Ill., a corporation of Illinois Application March 6, 1940, Serial No. 322,446

3 Claims. (Cl. 277—45)

This invention relates to vent valves and particularly to a structure designed to protect the contents of tanks or other closed containers against evaporation losses by breathing of the tanks due to the expansion and contraction of the contents thereof.

One object of the present invention is to provide a novel construction and arrangement of pressure and vacuum relief valves combined in a unitary structure, which may be readily connected to a tank opening for automatically relieving the tank of excess pressure or vacuum which may develop therein.

Another object of the invention is to provide a novel construction and arrangement of operatively related cooperating pressure and vacuum relief valves, wherein one of the valves is provided with a face or facing adapted to cooperate with a fixed seat, and wherein the other valve is adapted to seat on said face.

Another object of the invention is to provide manually actuated means for unseating one of the valves to facilitate filling or emptying of a tank to which the present invention is applied.

Another object of the invention is to provide releasable means operatively related to the manually actuated means for retaining one of a pair of spring-loaded valves in open position, and wherein the spring associated with one of said valves acts to move the manually actuated means out of valve opening position when the retaining means is released.

Another object of the invention is to provide a novel construction and arrangement of guides for the respective valves embodied in the present invention.

A further object of the invention is to provide a practical, durable, compact and efficient arrangement of pressure and relief valves for the purposes described.

A still further object of the invention is to improve devices of the character described in sundry details hereinafter referred to and particularly pointed out in the appended claims.

One embodiment of the present invention is shown for illustrative purposes in the accompanying drawings, in which:

Fig. 2 is an enlarged plan view of the upper portion of the structure illustrated in Fig. 1;

Fig. 3 is a fragmentary elevational view of a portion of the structure illustrated in Fig. 1, and taken substantially as indicated by the line 3—3 thereof;

Fig. 4 is a plan sectional view taken substantially as indicated by the line 4—4 of Fig. 1.

The present invention relates to a novel structure intended to provide an efficient seal for tanks, and to relieve the tanks of excess pressure or vacuum developed therein.

Figure 1:
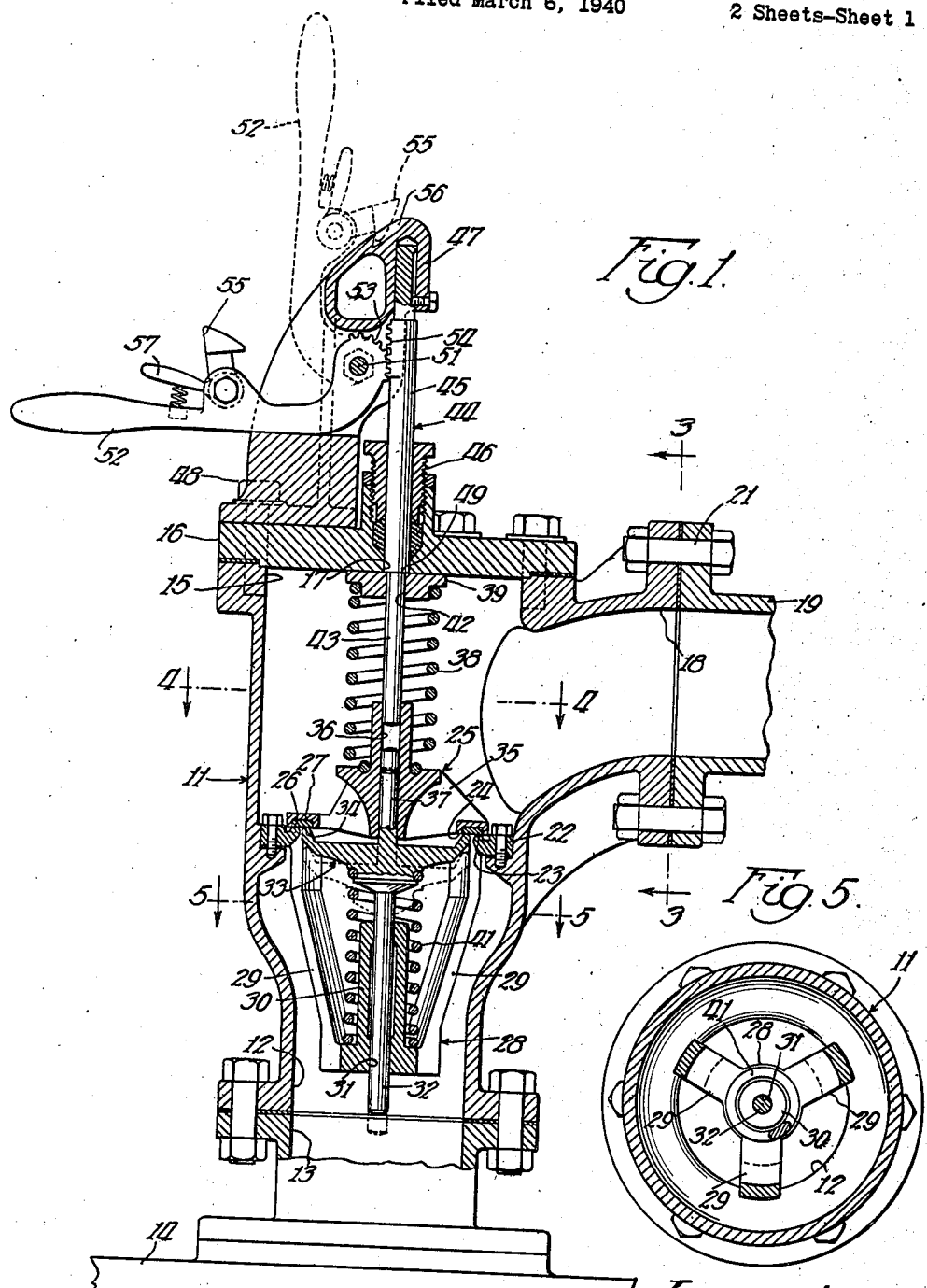
Fig. 1 is a sectional elevational view of a valve structure embodying features of the present invention, and taken substantially as indicated by the line 1—1 of Fig. 2.
Figure 5:
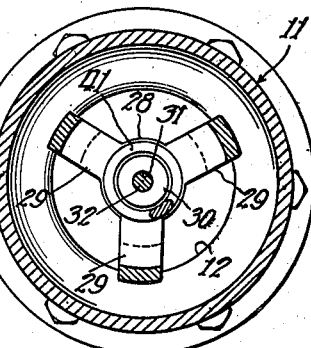
Fig. 5 is a plan sectional view taken substantially as indicated by the line 5—5 of Fig. 1.

The illustrative embodiment of the invention shown in the drawings comprises a hollow casing or body member indicated, as a whole, by the numeral 11 having a bottom opening 12 adjacent its lower extremity adapted to be positioned adjacent an opening 13 of a tank 14, a fragment of which is shown in Fig. 1, said casing 11 having a top opening 15 adjacent its upper extremity adapted to be closed by a cover member 16 having an aperture 17 formed therein adjacent the central portion thereof, while at one side of the casing 11 is a side opening 18 adapted to communicate with a vent pipe 19, a fragment of which is shown in Fig. 1 as attached to the casing by means of bolts 21.

Mounted within the casing 11 between the bottom opening 12 and the side opening 18 is an annular ring 22 having an annular valve seat 23 formed thereon adapted to be engaged by the face or facing 24 of a valve member 25 shown, in the present instance, as a pressure relief valve adapted to yield for relieving pressure within the tank 14.

To provide a suitable seal between the face 24 of the valve member 25 and the seat 23 of the ring 22, the face 24 of the valve 25 is shown, in the present instance, as provided, preferably, with an inlay 26 positioned in an annular groove or recess 27, and formed of pliable material, such, for example, as rubber, a material known to the trade as "Thiokol," or other suitable material intended to resist the action of gases, or the like, which may be given off by the contents of the tank 14.

Mounted also in the casing 11, and shown, in the present instance, as formed integrally with the ring 22 is a valve support indicated, as a whole, by the numeral 28 provided with annularly spaced downwardly extending leg portions 29 and having a centrally disposed vertically extending elongated boss or sleeve 30 provided with an opening 31 formed therein adapted to receive a lower stem portion 32 of a vacuum relief valve indicated, as a whole, by the numeral 33, the valve 33 being adapted to seat at 34, preferably, against the inlay 26 on the face of the pressure relief valve 25 to provide a suitable seal between the bottom opening 12 and side opening 18, as clearly illustrated in Fig. 1.

The central portion of the pressure relief valve 25 is connected to the outer portion of the valve carrying the face 24 by annularly spaced legs or webs 35, and is provided adjacent its central portion with an elongated opening 36 adapted to receive an upper stem portion 37 of the vacuum relief valve 33 in a manner to form a guide for the pressure relief valve 25.

For retaining the face 24 of the pressure relief valve 25 on its seat 23, resilient means, shown, in the present instance, as a spring 38 is positioned between the valve 25 and a collar 39 adjacent the cover member 16, and for normally retaining the vacuum valve 33 on its seat or against the face of the valve 25, resilient means shown, in the present instance, as a spring 41 is positioned between the vacuum relief valve 33 and a portion of the valve support 28, all as clearly illustrated in Fig. 1.

In order to maintain an efficient arrangement and operation of the pressure and vacuum relief valves 25 and 33 with reference to their respective seats, the springs 38 and 41 exert relatively different forces on their respective valve members 25 and 33. For example, the spring 38 may have a force of approximately four pounds per square inch to exert that pressure of the face 24 against its seat 23, while the spring 41 may exert, for example, a pressure of two pounds per square inch to insure efficient contact of the face 34 of the vacuum valve 33 against the face 24 of the pressure relief valve 25. Thus, it will be apparent that approximately four pounds per square inch of pressure in the tank 14 will serve to lift the pressure relief valve from its seat 23, and that a vacuum in the tank sufficient to overcome the force of the spring 41 will serve to move the face 34 of the vacuum relief valve 33 away from the face 24 of the pressure relief valve 25.

For manually controlling the position of one of the valve members, in the present instance, the vacuum relief valve 33, to facilitate filling or emptying of the tank 14, the collar 39 is provided with an aperture 42 adapted to receive a reduced portion 43 of a rod indicated, as a whole, by the numeral 44, the end portion 43 being adapted to extend into the elongated opening 36 formed in the pressure relief valve 25 in a manner to engage the upper end of the upper stem portion 37 of the vacuum relief valve 33, the upper or enlarged portion 45 of the rod 44 extending upwardly through a stuffing box 46 on the cover 16, and slidably mounted adjacent its upper end portion in a bracket 47 mounted on the cover member 16 and secured thereto by means of bolts 48.

Formed on the rod 44 between the reduced and larger portions 43 and 45, respectively, thereof is a shoulder 49 adapted to engage the collar 39, and pivotally mounted at 51 on the bracket 47 is a lever 52 having a toothed segment 53 adjacent its pivot adapted to cooperate with a toothed rack 54 carried by the rod 44.

It will be observed, by such an arrangement, that when the lever 52 is swung upwardly about its pivot 51 to the dotted line position shown in Fig. 1, the segment and rack connection 53—54 will force the rod 44 downwardly against the action of the spring 38 and into engagement with the upper end of the upper stem portion 37 of the vacuum relief valve 33, thereby moving the face 34 thereof out of engagement with the face 24 of the pressure relief valve 25 as indicated by dotted lines in Fig. 1, thus relieving the tank 14 of all pressure or vacuum to facilitate filling or emptying of the tank.

For maintaining the rod in its lowered position and the vacuum relief valve 33 in open position, the lever 52 is provided with a latch or dog 55 adapted to enter a recess 56 formed in the bracket 57 to retain the lever in its raised position until such time as it is desired to close the vacuum relief valve 33, at which time, the latch 55 may be lifted from the recess 56 by means of a finger piece 57.

It will be observed from the foregoing description that the present invention provides a novel construction and arrangement whereby an efficient seal is normally maintained against the escape of gases or other contents of the tank under normal conditions, and wherein the tank is relieved of excessive pressure or vacuum developed in the tank; also, that the present invention provides novel means for manually venting the tank to facilitate filling or emptying thereof when desirable.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a device of the class described and in combination, a hollow casing having top, bottom and side openings formed therein, a cover member having an aperture therein secured to said casing adjacent said top opening, a valve ring having a seat formed thereon mounted in the casing between said bottom and side openings, a pressure relief valve member having a facing engaging said seat, a valve support carried by said ring, a vacuum relief valve member engaging said facing and having stem portions extending at opposite sides of said vacuum relief valve member, one of said stem portions being slidably mounted in said support and the other of said stem portions extending into said pressure relief valve member to provide a guide therefor, a pair of springs operatively related to said pressure and vacuum relief valve members for urging the respective valve members against said seat and facing, respectively, a manually actuated rod slidably mounted in the aperture of said cover and extending into said pressure relief valve to engage a stem portion of said vacuum relief valve for moving the vacuum relief valve out of engagement with said facing, and releasable means mounted on said cover member for retaining said rod in valve opening position, one of said springs being operatively related to said rod for returning the rod to normal position when said last-mentioned means is released.

2. In a device of the class described and in combination, a casing having a plurality of spaced openings formed therein, a cover member having an aperture therein secured adjacent one of said openings, an annular valve seat in said casing between other of said openings, a valve member having a face engageable with said seat, a second valve member engageable with and adapted to seat on the face of said first mentioned valve member, springs of relatively different force operatively related to the respective valve members for urging said valve members against their respective seats, a bracket mounted on said cover member, a rod having a toothed rack formed thereon slidably mounted in said cover member and bracket, a lever pivotally mounted on said bracket, and a toothed segment on said lever operatively related to said rack for moving the rod and one of said valve members out of engagement with its seat against the action of the spring operatively related to said one of the valve members.

3. In a device of the class described and in combination, a hollow casing having top, bottom and side openings formed therein, a cover member having an aperture therein secured adjacent said top opening, an annular valve seat in said casing between said bottom and side openings, a pressure relief valve member having a face engageable with said seat, a vacuum relief valve member engageable with and adapted to seat on the face of said pressure relief valve member, springs of relatively different force operatively related to the respective valve members for urging said valve members against their respective seats, a bracket having a recess formed therein mounted on said cover member, a rod engageable with said vacuum relief valve member and slidably mounted in said cover member and bracket, a toothed rack on said rod, a lever pivotally mounted on said bracket, a toothed segment on said lever operatively related to said rack for moving the rod and said vacuum relief valve member out of engagement with its seat against the action of the spring operatively related to said last mentioned valve member, and a releasable latch mounted on said lever and engageable with the recess in said bracket for retaining vacuum relief valve in open position.

WILLIAM A. LEBUS.